United States Patent [19]

Newell et al.

[11] Patent Number: 5,185,839
[45] Date of Patent: Feb. 9, 1993

[54] FIBER OPTIC CABLE RECEPTACLE

[75] Inventors: Edwin R. Newell, Wake Forest; Jackie C. Sullivan, Wendell, both of N.C.

[73] Assignee: Square D Company, Palatine, Ill.

[21] Appl. No.: 635,841

[22] Filed: Dec. 31, 1990

Related U.S. Application Data

[63] Continuation-in-part of Ser. No. 433,940, Nov. 9, 1989, Pat. No. 5,048,920, which is a continuation-in-part of Ser. No. 242,359, Sep. 9, 1988, Pat. No. 4,911,517.

[51] Int. Cl.$^5$ .......................... G02B 6/36; G02B 7/20
[52] U.S. Cl. ....................................... 385/90; 385/139
[58] Field of Search ........................... 350/96.2, 96.21; 385/90, 136, 137, 139

[56] References Cited

U.S. PATENT DOCUMENTS

| | | | |
|---|---|---|---|
| 4,838,641 | 6/1989 | Morimoto et al. | 350/96.21 |
| 4,878,729 | 11/1989 | Stewart | 350/96.18 |
| 4,903,337 | 2/1990 | Newell et al. | 455/605 |
| 4,911,517 | 3/1990 | Newell et al. | 350/96.2 |

Primary Examiner—John D. Lee
Assistant Examiner—Robert E. Wise
Attorney, Agent, or Firm—Michael J. Femal; Hugh M. Gilroy

[57] ABSTRACT

The cable receptacle of the present invention allows for substantially unimpeded insertion of a fiber optic cable and the selective impeding of the withdrawal of the fiber optic cable through retention structure. The retention structure is provided by cooperation among a cover, a housing, a gripper, a pivot support arm and a channel. The cover includes a fiber opening through which the fiber optic cable extends and a gripping adjustment opening allowing access to a positioning portion of the gripper. A housing is attached to the cover and may include either a portion of the channel, or the pivot support arm or both. To the extent that the housing does not provide, or only partially provides, the channel or pivot support arm then the cover makes up the lack. A gripper having a tooth end and a distal end to either side of the pivot point, includes a resilient spring to bias the gripper to the end into engagement with the fiber optic cable. The pivot support arm pivotally supports the gripper for rotation. The channel receives the fiber optic cable and usually includes an opposing surface to fix the cable between the tooth end of the gripper and the opposing surface to prevent axial movement. A channel at least partially surrounds the circumference of the cable to a degree sufficient to prevent movement of the cable in an off axis direction. The receptacle of the present invention generally impedes movement of the cable while the gripper is engaged with the cable which allows easy insertion of the cable.

34 Claims, 5 Drawing Sheets

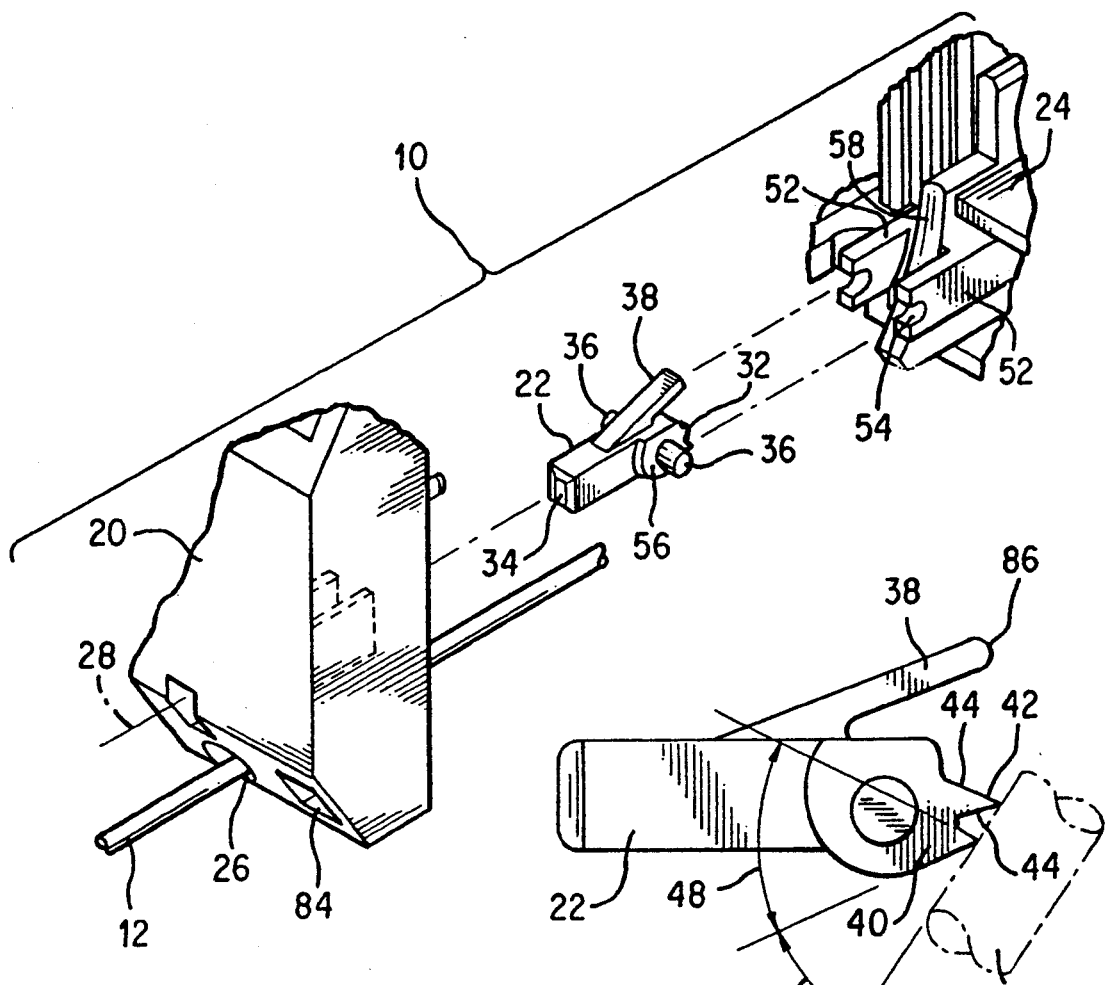
FIG. 1
FIG. 2
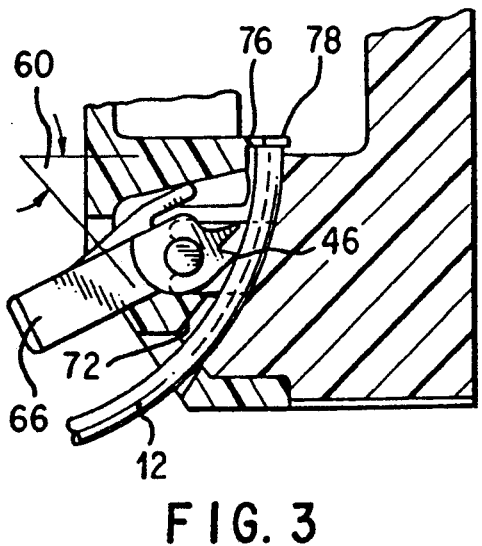
FIG. 3
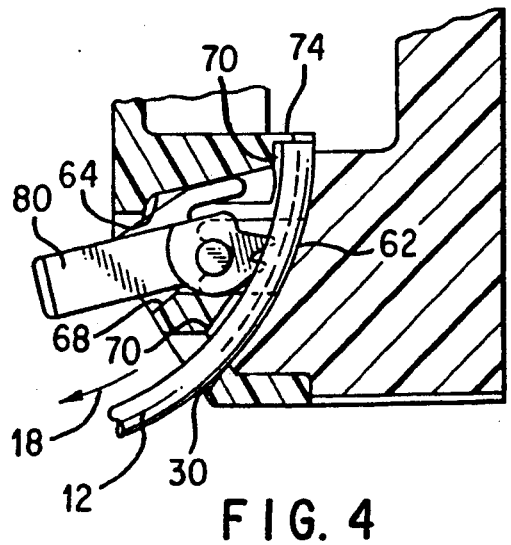
FIG. 4

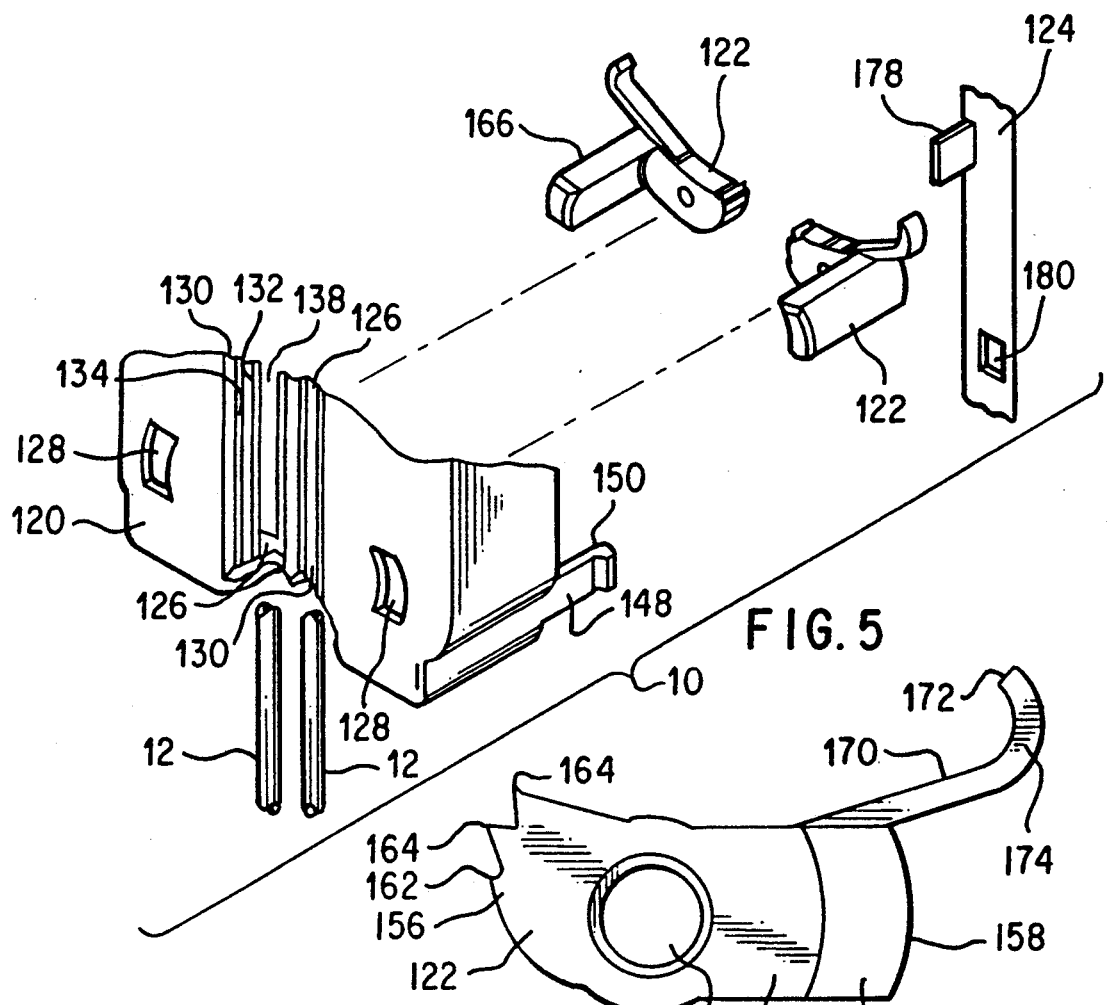
FIG. 5
FIG. 6
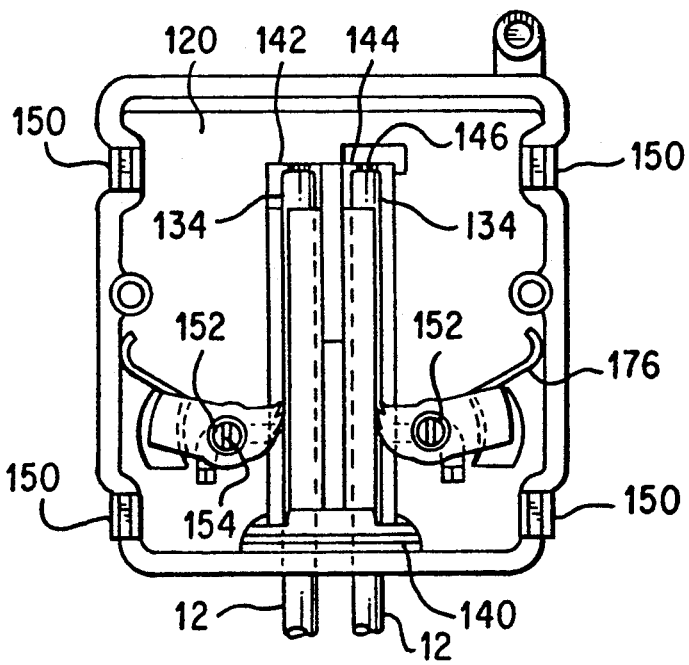
FIG. 7
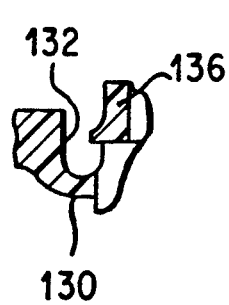
FIG. 7A

FIBER OPTIC CABLE RECEPTACLE

RELATED APPLICATIONS

This application is a continuation-in-part of Child U.S. application Ser. No. 07/433,940, now U.S. Pat. No. 5,048,920, filed Nov. 9, 1989 by Newell et al and assigned to the assignee of the present invention, Square D Company. Child U.S. patent application Ser. No. 07/433,940, now U.S. Pat. No. 5,048,920, is a continuation-in-part of Parent U.S patent application Ser. No. 07/242,359, now U.S. Pat. No. 4,911,517 filed Sep. 9, 1988 by Newell et al and assigned to the assignee of the present invention.

BACKGROUND OF THE INVENTION

This invention relates to receptacles of cable and particularly relates to fiber optic cable receptactles.

Fiber optic cable receptacles are generally known to secure fiber optic cables to enclosures. Some receptacles employ a plurality of discreet and separate parts, and require considerable cable preparation to include stripping a cable sheath or relatively precise termination of the fibers within. The present invention is an improvement to the receptacle shown in U.S. Pat. No. 4,911,517.

U.S. Pat. No. 4,911,517 issued to Edwin R. Newell et al on Mar. 27, 1990 describing a MEANS FOR CLAMPING FIBER OPTICAL CABLE and assigned to the assignee of the present invention.

Often, fiber optic cable is used to connect a transceiver and a switch in the control of machinery and electricity. Examples of such transceivers and switches are shown by U.S. Pat. Nos. 4,878,729 and 4,903,337.

U.S. Pat. No. 4,878,729 issued to David G. Stewart on Nov. 7, 1989 describing an OPTICAL SWITCH and assigned to the assignee of the present invention.

U.S. Pat. No. 4,903,337 issued to Edwin R. Newell et al on Feb. 20, 1990 describing a FIBER OPTIC TRANSCEIVER and assigned to the assignee of the present invention.

Each of the foregoing patents and applications owned by Square D Company are incorporated herein by reference.

SUMMARY OF THE INVENTION

The fiber optic cable receptacle of the present invention has a cover, and one way retention means operatively associated with the cover. The cover includes a fiber optic opening through which the fiber optic cable extends. The one way retention means allows the substantially unimpeded insertion of the fiber optic cable through the cover and selectively impedes the withdrawal of the fiber optic cable from the retention means.

BRIEF DESCRIPTION OF THE DRAWING

FIG. 1 is an exploded view of an embodiment of the fiber optic receptacle of the present invention.

FIG. 2 is a gripping component of the receptacle of FIG. 1.

FIG. 3 shows the gripping component of FIG. 2 in position to selectively allow the withdrawal of the fiber optic cable without impediment.

FIG. 4 shows the gripping component in a position to selectively impede the withdrawal of the fiber optic cable.

FIG. 5 is an exploded view of an alternate embodiment of the receptacle of the present invention.

FIG. 6 is a plane view of an alternate gripping component of the present invention.

FIG. 7 shows the gripping component of FIG. 6 in a position to impede the withdrawal of the fiber optic cable.

FIG. 7A is a cross section of a portion of the cover.

DETAILED DESCRIPTION OF THE DRAWING

Figure 8:
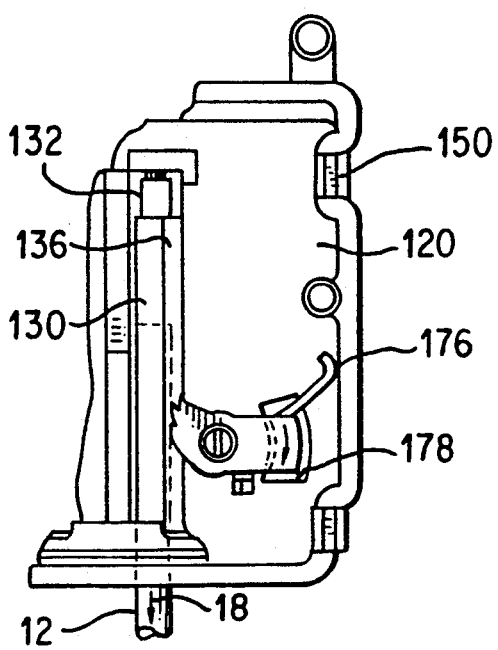
FIG. 8 shows the gripping components of the present invention in a position to allow the selective withdrawal of the fiber optic cable.
Figure 9:
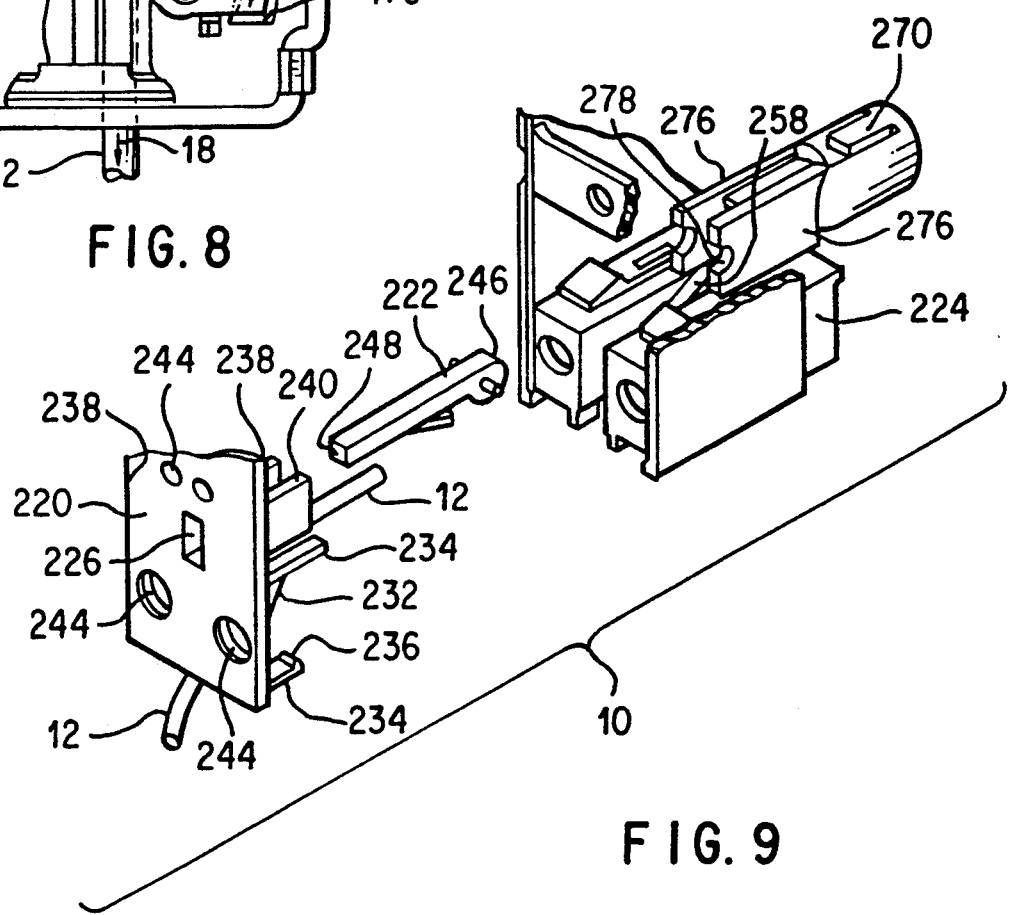
FIG. 9 is an exploded view of an alternate embodiment of the present invention.
Figure 10:
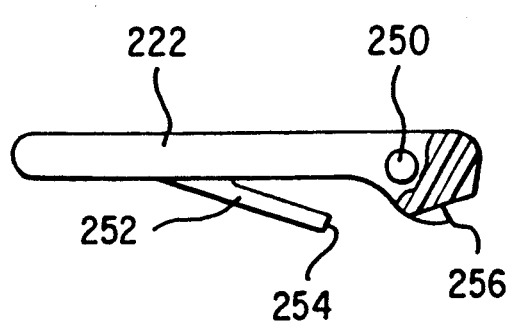
FIG. 10 is a side view of the gripping component of the present invention partially in cross section.
Figure 10A:
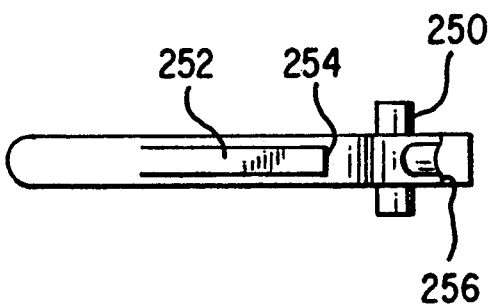
FIG. 10A is a bottom view of the gripping component.

Differing embodiments of the fiber optic cable receptacle 10 of the present invention are shown in exploded views in FIGS. 1, 5 and 9. Fragmentary alternate embodiments of the cable receptacle 10 of the present invention are also shown in FIGS. 13, 14, 17 and 19. Cable receptacle 10 is designed to work with fiber optic cable 12, which includes sheath 14 and optic fiber 16 (shown in FIG. 17). Receptacle 10 selectively impedes movement of cable 12 in a withdrawal direction 18, while not impeding movement of cable 12 in an opposite insertion direction.

In addition to cable 12, FIG. 1 shows the three major components of receptacle 10; cover 20, gripper 22 and housing 24. Cover 20 and housing 24 are shown in fragmentary views which are sufficient to show the inter relationship among the components and their features. Cover 20 includes cable opening 26 and gripper adjustment opening 28. Cable opening 26 includes opening taper 30, facilitating the insertion of cable 12 through cover 20.

Gripper 22, shown in side elevation in FIG. 2, includes a tooth end 32 and distal end 34 to either side of pivot arms 36. Resilient spring arm 38 is located between pivot arms 36 and distal end 34. A first gripping tooth 40 is located at tooth end 32, as is successive tooth 42. First gripping tooth 40 and successive tooth 42 are formed by angled sides 44 meeting at an apex forming contact edge 46 which deforms into sheath 14. Angled sides 44 have an angular separation 48 which is the penetration angle of the tooth. Attitude angle 50 being the angle between the tangent of cable 12 at the point of contact between cable 12 and contact edge 46 and the nearest angled side 44 partially determines the aggressiveness with which teeth 40, 42 deform into sheath 14, which is often a polyvinyl chloride composition.

Housing 24 has a pivot support arm 52 for each gripper pivot arm 36. Pivot support arm 52 extends towards cover 20 and is integrally formed in housing 24. At the distal end of each pivot support arm 52 is concave pivot saddle 54 which receives pivot arm 36 to allow the rotation of gripper 22. Inboard of each arm is pintal boss 56 which fits between the inner edges of arms 52 to fix gripper 22 against axial movement along its pivot point axis. Housing channel portion 58 lies between pivot arms 52 in housing 24. It is circumferentially curved to basically conform to the circumference of sheath 14 and also axially curved to bend cable 12 axially. Housing channel 58 subtends an arc to form axial angle 60 as shown in FIG. 3. Towards the middle of housing channel 58 forms an opposing surface 62. Cable 12 is generally restrained against axial movement in a withdrawal direction by being very slightly pinched between gripping tooth 46 and opposing surface 62, as further explained below. Resilient spring arm 38 lightly bears against spring surface 64, which is part of gripper adjustment opening 28. As symbolically shown in FIG. 2, contact edge 46 very slightly deforms sheath 14 by being biased into engagement with sheath 14 by resilient spring arm 38. If contact edge 46 is not lifted from contact with sheath 14 by depressing handle 66 of gripper 22, as shown in FIG. 3, then, as shown in FIG. 4, withdrawal of cable 12 draws successive tooth 42 into deeper deformation of sheath 14. Cable opening 28 is generally rectangular and includes rotational stop surface 68, limiting the rotation of gripper 22. Stop surface 68 tends to protect resilient arm 38 from non-elastic deformation.

Preferably gripper 22 and other components of receptacle 10 are molded from an engineering plastic such as a glass filled polycarbonate having a 20 percent glass content similar to Celanese no. 3210.

Figure 16:
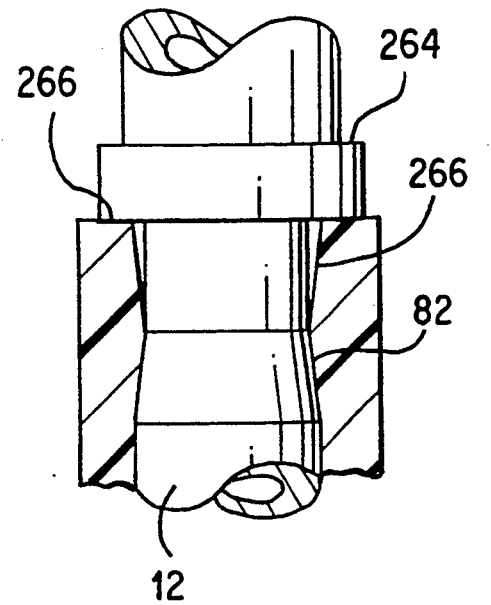
FIG. 16 shows a portion of a channel having a tapered end.

Cover 20 also has a cover channel portion 70 which complements housing channel 58 to form cable channel 72 which is substantially filled by cable 12 to either end of its extent. Portions of cover channel 70 may be curved circumferentially or axially, if desired. Cover channel 70, after a fashion, acts as a lip to prevent movement of fiber 12 in a non-axial direction in cooperation with housing channel 58. A stop 74 including stop lip 76 with U-shaped fiber cut out 78 limits the degree of insertion of cable 12 while allowing light to be transmitted through cut out 78. Contact edge 46 of first gripping tooth 40 and contact edge 46 of successive tooth 42 form a cam rotating about the pivot axis of pivot arms 36. Clockwise rotation of gripper 22 brings contact edge 46 of successive tooth 42 closer to opposing surface 62. FIG. 4 illustrates the engagement of both the teeth 40,42 deforming sheath 14. The degree of deformation of sheath 14 should be chosen to substantially impede the withdrawal of cable 12 without presenting a substantial risk of severing cable 12 or sheering teeth 40,42. Conversely counter clockwise rotation of gripper 22 moves contact edges 46 of both first gripping tooth 40 and successive tooth 42 away from opposing surface 62. Axial angle 60 should be appropriately chosen to cause cable 12 to elastically curve while having a tendency to straighten. The portion of sheath 14 contiguous to housing channel 58, tends to fix or align cable 12 and the transmission of light through optical fiber 16. The interrelationship among the various angles illustrated have not been exhaustively tested, but it is believed that angles of approximately the same size as those illustrated are suitable. The axial angle 60 illustrated is about 50 degrees. The penetration angle 48 is also about 50 degrees. Attitude angle 50 is about 35 degrees. Gripper 22 serves as gripping means for allowing relative movement between a sheath 14 of the cable 12 and gripper tooth end 32 in an insertion direction while impeding relative movement between sheath 14 and tooth end 32 in an withdrawal direction 18. Tooth end 32 abuts sheath 14 because of the action of resilient spring 38 serving as bias means to selectively cause gripper 22 to abut sheath 14. Gripper 22 in cooperation with cover 20 and opposing surface 62 serve as one way retention means to allow the substantially unimpeded insertion of the fiber optic cable 12 and selectively impeding the withdrawal of the fiber optic cable 12 from the retention means. The portion of gripper 22 extending between pivot arm 36 and distal arm 34 is a lever arm 80 which acts as positioning means for causing gripper tooth end 32 to be removed an abutting relationship with sheath 14. The lever arm 80 rotates in a positioning plane to remove first gripping tooth 40 from sheath 14. The positioning plane lies in the plane of the drawing sheet of FIGS. 3 and 4 and coincides with a cable plane determined by the curvature of cable 12. Channel 72 serves as alignment means for aligning fiber optic cable 12 having an integral cover channel portion 70 formed integrally with cover 20. Cover channel portion 70 also act as a retaining lip which extend axially along the cable 12 as does housing channel portion 58. These retaining lips 58, 70 serve as non-axial restraint means for preventing movement of cable 12 in a non-axial direction. At an inner most end of channel 72 stop 74 including stop lip 76 serves as stop means to limit the length of insertion of cable 12. Limiting the length of insertion of cable 12 is achieved in FIG. 16 by tapered reduction 82.

FIGS. 5 through 8 illustrate an alternate embodiment of cable receptacle 10 which includes a projecting handle. This cable receptacle 10 includes cover 120, gripper 122 and housing 124. In this embodiment both fiber optic cables 12 are shown with complimentary structure. The embodiment of FIGS. 1 through 4 similarly has two cables only one of which is shown. These two embodiments are particularly suitable for use in a switch providing a cable for the equivalent of a normally open contact and the equivalent of a normally closed contact.

Cover 120 includes cable channels 126 which are generally U-shaped and arcuate gripper adjustment openings 128. U-shaped channel 126 is best understood by viewing both FIG. 5, which shows a front prospective view of housing of cover 120, and FIGS. 7 and 8, which show the interior rear view of cover 120. Channels 126 each include an arcuate bottom 130 depending from a generally straight inner leg 132 and outer leg 134. The outer most portion of outer leg 134 includes a channel lip 136. Channel separator 138 lies between channels 126 and has outer walls which form inner legs 132 of channels 126. As in the embodiment illustrated in FIGS. 1 through 4, each channel 126 has an opening taper 140 to assist guiding fiber optic cable 12 into channels 126. Similarly, each channel terminates in a stop 142 on the interior of cover 120 including a stop lip 144 and a U-shaped cut out 146. Cover 120 further includes securing arms 148 terminating in wedge fasteners 150. Similar arms are associated with the embodiment of FIGS. 1 through 4 extending from housing 24 and being received in fastener receiver opening 84 in cover 20. Securing arms 148 are located adjacent the corners of rectangular cover 120. Slightly inboard and above the lower securing arms 148 are slotted gripper posts 152 extending from the cover 120 towards the housing 124. Slotted gripper posts 152 have slots 154 which assist in retaining gripper 122 on gripper post 152. The center of curvature of arcuate gripper adjustment openings 128 are advantageously placed at the center of slotted gripper post 152 which is also the center of rotation for gripper 122.

Gripper 122 includes a toothed end 156 and a distal end 158 to either side of a pivot point being a pivot hole 160. Toothed end 156 includes a first gripping tooth 162. Gripper 122 functions in a manner similar to gripper 22 in that rotation of distal ends 158 upwards and towards the center of cover 120 draws successive teeth 164 into deforming sheath 14. First gripping tooth 162 is in sufficient contact with sheath 14 to cause this rotation unless it is selectively disengaged. Continued withdrawal of cable 12 will cause the upper most successive tooth 164 into deformation of sheath 14 as shown in FIG. 7. Adjacent distal end 158 is handle 166 which extends outwardly through arcuate gripper adjustment opening 128, and has a center of curvature about the center of slotted gripper posts 152. Lever handle 168 lies between pivot hole 160 and handle 166, transmitting forces applied to handle 166 to withdrawal gripping tooth 162 or biasing forces from resilient spring arm 170 which cause gripping tooth 162 to abut sheath 14. Resilient spring arm 170 extends somewhat radially beyond distal end 158 to terminate in a spring distal end 172 adjacent arcuate portion 174. Spring arcuate 174 bears against spring surface 176 on the interior side of cover 120. The arcuate shape of spring 170 tends to enhance the sliding of spring 170 along surface 176. Spring distal end 86 of resilient spring arm 38 is similarly rounded although the potential frictional forces are much, much lower due to differing geometries. Non-elastic deformation of resilient spring arms 176 is prevented by rotational stop surface 178, which is part of arcuate gripper adjustment opening 128. Gripper 122 is pivotally mounted on slotted gripper post or pivot support arm 152 axial stop 178 is drawn into abutting contact with gripper 122 when wedge fasteners 150 are received in fastener openings 180 in housing 124.

FIGS. 9 through 12 illustrate a bottom entrance fiber optic cable receptacle 10 embodiment of the present invention. This embodiment of receptacle 10 is extremely similar to the embodiment of receptacle 10 shown in FIGS. 1 through 4 with the exception of a few substantial differences which will be discussed as they arise below.

This embodiment of receptacle 10 includes cover 220, gripper 222 and housing 224.

Cover 220 includes a gripper adjustment opening 226 but lacks a front panel opening analogous to cable opening 26. Gripper adjustment opening 226 does include equivalents to both rotational stop surface 68 and spring surface 64 in one spring stop surface 228. Spring stop surface 228 can be viewed as a continuation of the top surface 230 of channel panel 232 which divides the width of housing 220 and extends upwards from its bottom to the bottom surface or spring stop surface 228 of gripper adjustment opening 226. Securement arms 234 terminating in wedge fasteners 236 are disposed adjacent cover sides 238 to either side of channel panel 232. An axial stop post is disposed to either side of channel panel 232 between channel panel 232 and securement arms 234. Channel panel 232, securement arms 234 and axial stop posts 240 each extend towards housing 224 to cooperate with associated structure. Channel panel bottom surface 242 arcuately curves upwards and towards housing 242 is axially curvature and is also circumferentially curved about the circumference of fiber optic cable 12. In addition to having securement arms 234 rather than fastener openings 84, cover 220 differs from cover 20 in having a plurality of cover openings 244 serving a variety of fastening and adjustment functions for components associated with housing 224 such as terminals, geometers and fastening screws. Gripper 222 is shown primarily in side elevation, partially in cross section, in FIG. 10. Gripper 222 includes tooth end 246 and distal end 248 extending to either side of a pair of pivot arms 250. Each pivot arm extends outwardly at right angles to the major axis of gripper 222. Resilient spring arm 252 having spring distal end 254 extends downwardly between pivot arm 250 and distal end 248. Concave gripping tooth 256 also extends downwardly from tooth end 246. The concavity of concave tooth 256 is selected to deform sheath 14 for a greater circumferential arc than a non-concave tooth could. Both distal spring end 254 and tooth 256 project to the same side of the major axis of gripper 222.

Figure 11:
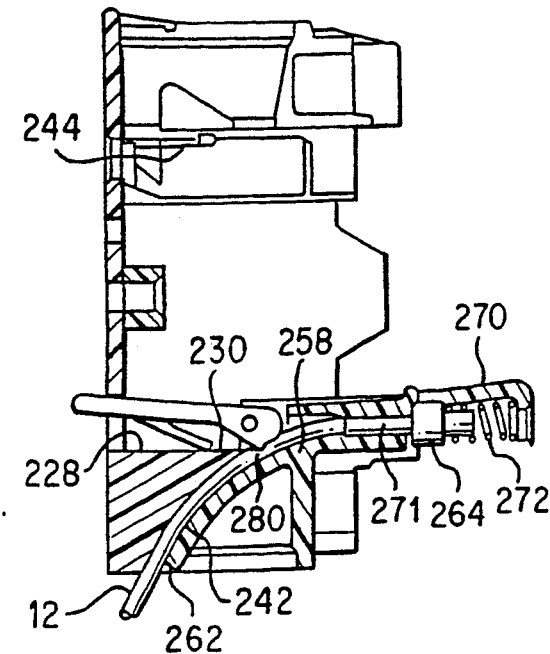
FIG. 11 shows the gripping component of the present invention in a position to impede the withdrawal of the fiber optic cable.
Figure 12:
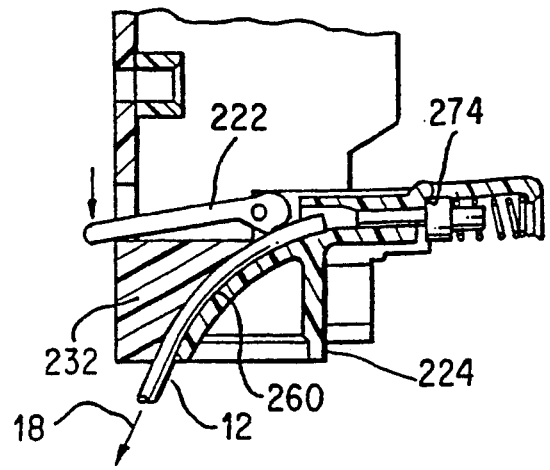
FIG. 12 shows the gripping component of the present invention allowing the selective withdrawal of the fiber optic cable.

Housing 224 includes a housing channel which is both axially and circumferentially curved to act in cooperation with channel panel bottom surface 242 which serves as a lip to form channel 260. Channel 260 is otherwise similar to channel 72 for its greater portion and also includes opening taper 262. However, the inner most end of channel 260 is quite a bit different from channel 72. Channel 260 lacks stop 74 and is wholly contained within housing 224 which accommodates the mate between cable 12 and coupler 264. An insertion taper 266 symbolically shown in FIG. 16 can be used to assist the abutting interface 266 between the coupler 264 and channel 262. The showing is symbolic because tapered reduction 82 and coupler 264, with associated structure, would not appear in the same structure unless it was split along an axial median of channel 262. Coupler 264 may be held in place from withdrawal from channel 262 where aligned with resilient stop 270, or alignment spring 272, or both: Absent one of these tapers, stops, or springs, coupler taper 274 could under some conditions allow significant misalignment. Pivot support arms 276 extend towards cover 220 and have pivot arm saddles 278 at their distal ends. Each pivot arm saddle 278 receives a pivot arm 250 for providing rotational support to gripper 222, as shown in FIGS. 11 (full engagement) and 12 (released). Slightly below pivot arm saddles 278, and inboard of them, housing channel 258 forms opposing surface 280 so that cable 12 is restrained between tooth 256 and opposing surface 280, if an attempt to withdraw cable 12 without first disengaging tooth 256.

Figure 13:
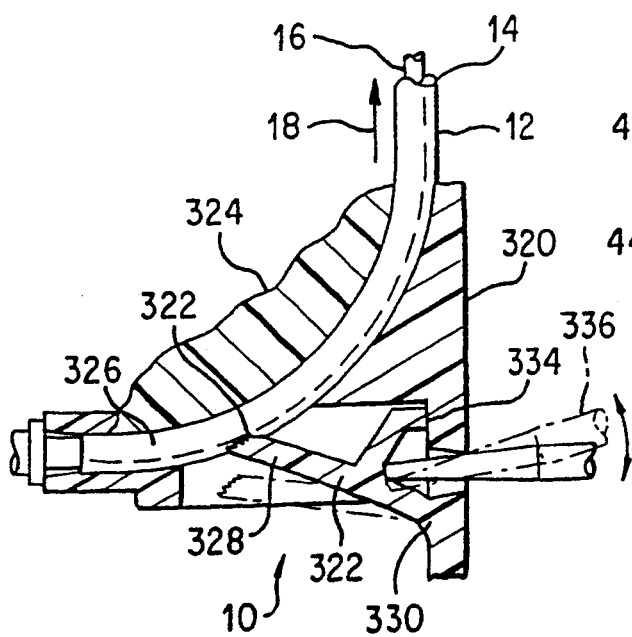
FIG. 13 is an alternate embodiment in a cross section of the present invention.

FIG. 13 shows a flexure embodiment of cable receptacle 10. Cover 320 has an integral gripper 322 and housing 324. Channel 326 is split between housing 324 and cover 320 and is similar to channel 72 and channel 260. Gripper 322 principally comprises resilient arm 328 having an attachment end 330 where it joins cover 320 and toothed end 332 where it engages fiber optic sheath 14. Positioning arm 334 fixes toothed end 332 in a position to engage cable 12 unless adjustment tool 336 is used to disengage toothed end 332 as shown in phantom.

Figure 14:
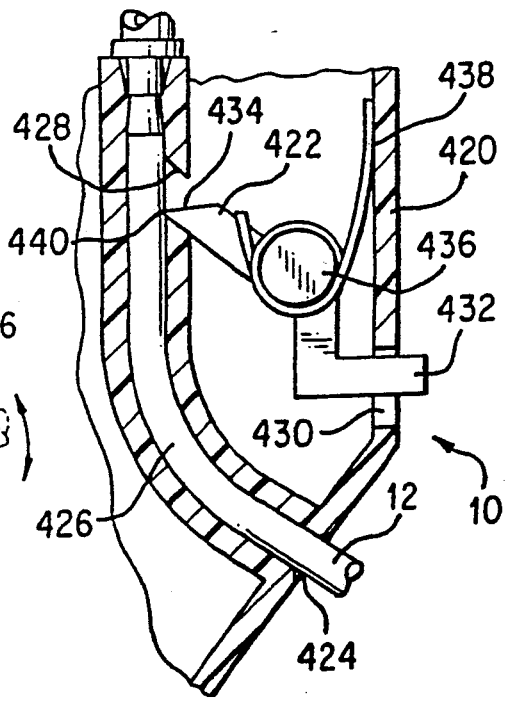
FIG. 14 is an alternate embodiment of the present invention partially in cross section in a position where the gripping component is impeding the withdrawal of the fiber optic cable.
Figure 15:
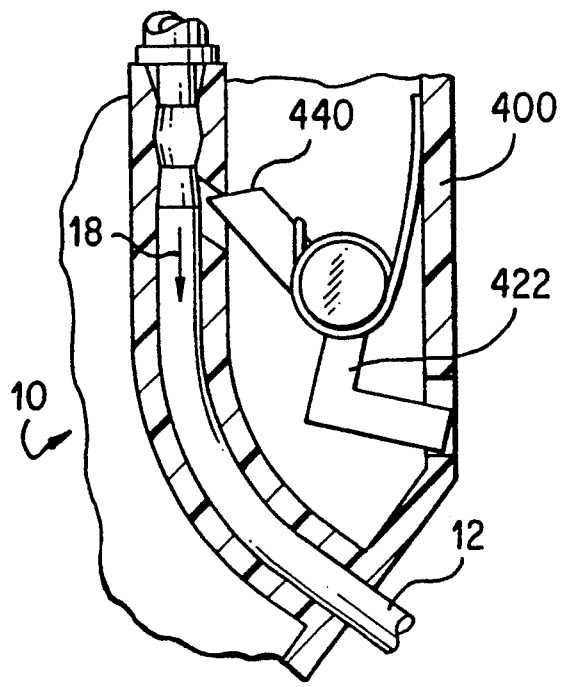
FIG. 15 shows the gripping means of FIG. 14 in position to allow the selective withdrawal of the fiber optic cable without impediment

FIG. 14 and 15 illustrate an alternate embodiment of fiber optic cable receptacle 10 which does not include an intrical resilient portion common to the embodiments of the invention discussed above.

This embodiment of fiber optic cable receptacle 10 includes cover 420 and gripper 422. Cover 420 includes cable opening 424 leading into substantially enclosed channel 426 including a tooth access 428. Cover 420 further includes gripper adjustment opening 430.

Gripper 422 includes distal end 432 and toothed end 434 to either side of gripper pivot point 436. Gripper toothed end 434 is biased into engagement with sheath 14 by gripper spring 438, which is a conventional metallic spring. FIG. 14 illustrates tooth 440 slightly deforming sheath 14 to retain the cable against withdrawal.

FIG. 15 is an illustration showing tooth 440 withdrawn from engagement so that cable 12 may be withdrawn without substantial impediment.

Figure 17:
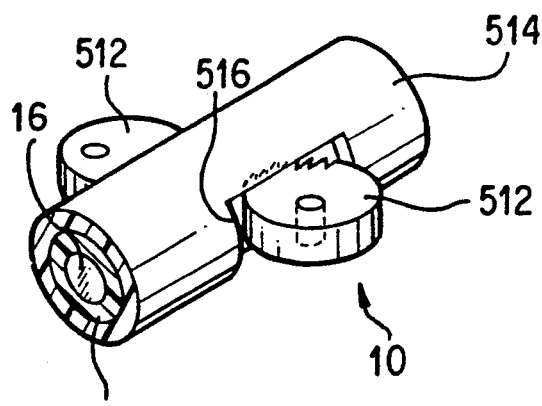
FIG. 17 is a perspective view of an alternate embodiment of the present invention.
Figure 18:
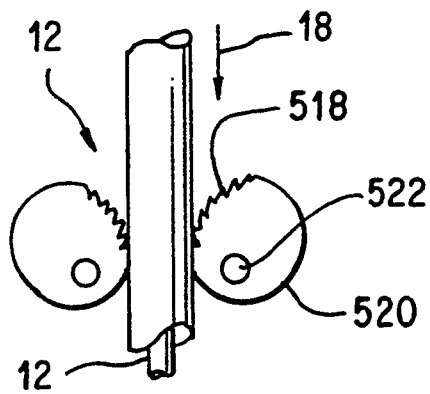
FIG. 18 is a top view of the embodiment shown is FIG. 17 with the gripping components in a position to allow the selective withdrawal of the fiber optic cable.

FIGS. 17 and 18 are perspective and top views of an alternate embodiment of fiber optic cable receptacle 10 lacking the opposing surface portion of the fiber optic cable channel present in the earlier discussed embodiments. Fiber optic cable receptacle 10 of this embodiment of the invention includes a first and second gripper 512 to either side of an enclosed channel tube 514, which includes a pair of tooth accesses 516 adjacent each gripper 512. Each gripper includes a tooth end 518 and a distal end to either side of a pivotal 522. FIG. 17 shows tooth ends 518 in engagement with sheath 14 on either side of cable 12. FIG. 18 shows tooth ends 518 withdrawn from engagement with sheath 14 to allow withdrawal of cable 12 without impediment. Other aspects of fiber optic cable receptacle 10 shown in earlier embodiments of the present invention are omitted for clarity in these two views.

Figure 19:
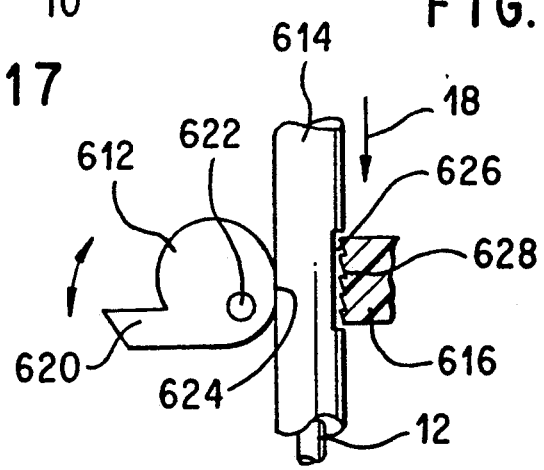
FIG. 19 is a top view of an alternate embodiment of the present invention.

A similarly abbreviated view of an alternate embodiment of cable receptacle 10 is shown in FIG. 19 which lacks the moveable teeth present in each of the earlier embodiments discussed above. This embodiment includes gripper 612, channel tube 614 and toothed post 616. Gripper 612 is similar to those earlier shown in having a distal end 620 to one side of a pivot hole 622. However, gripper 612 lacks a toothed end and instead is contact end 624 which bears against sheath 14. Channel tube 614 has two access holes 626, only one of which is visible in FIG. 19. Engagement end 624 bears against sheath 14 through the access hole not shown in this Figure and toothed post 616 bears against the other side of sheath 14 as shown. Sheath 14 is slightly pinched between engagement end 626 and wedge shaped teeth 628 to impede the withdrawal of cable 12. The eccentric (with respect to pivot hole 622) engagement end 624 may be rotated free of engagement with sheath 14 to allow cable 12 to be withdrawn without substantial impediment.

As those skilled in the art will readily recognize, some of the invention elements may be interchanged, for example those shown as integral may be separated or those separated may be made integral without adversely affecting the performance of the invention.

From the foregoing description it will be apparent that modifications can be made to the fiber optic cable receptacle of the present invention without departing from the teaching of the invention. Also it will be appreciated that the invention has a number of advantages, some of which have been described above and others of which are inherent in the invention. Accordingly, the scope of the invention is only to be limited as is necessitated by the accompanying claims.

We claim:

1. A fiber optic cable receptacle comprising:
   a cover having a fiber opening through which said fiber optic cable extends; and
   one way retention means for allowing the substantially unimpeded insertion of said fiber optic cable and for selectively impeding the withdrawal of said fiber optic cable from said retention means, said retention means although impeding withdrawal of said fiber optic cable not impeding insertion of said fiber optic cable, said retention means operatively associated with said cover.

2. The receptacle of claim 1 wherein said retention means further includes:
   gripping means for allowing relative movement between a sheath of said fiber optic cable and said gripping means in an insertion direction and selectively impeding relative movement between said sheath and said gripping means in a withdrawal direction, said gripping means abutting said sheath.

3. The receptacle of claim 2 wherein said retention means further includes:
   abutting bias means for selectively causing said gripping means to abut said sheath.

4. The receptacle of claim 3 wherein said retention means further includes:
   positioning means for causing said gripping means to be removed from abutting said sheath.

5. The receptacle of claim 4 wherein:
   said cover further has a gripping adjustment opening; and
   said positioning means is adjacent to said gripping adjustment opening and adjustable therethrough.

6. The receptacle of claim 4 wherein:
   said cover further has a gripping adjustment opening;
   said cable is generally contained in a cable plane; and
   said positioning means is a lever arm which generally rotates in a positioning plane to cause said gripping means to be removed from abutting said sheath, said lever extending through said gripping adjustment opening.

7. The receptacle of claim 6 wherein said positioning plane and said cable plane generally coincide in a retaining plane.

8. The receptacle of claim 7 wherein said lever arm is only partially contained in said retaining plane and has a handle portion which rotates with cylindrical motion perpendicular to said retaining plane and extends through said gripping means adjustment opening.

9. The receptacle of claim 3 wherein said abutting bias means includes a spring.

10. The receptacle of claim 9 wherein said spring is a resilient arm integral with said gripping means.

11. The receptacle of claim 2 wherein said gripping means further includes:
    a gripping tooth having a preselected penetration angle forming a contact edge to deform into said sheath and a preselected attitude angle causing said contact edge to dig into said sheath when said sheath is moved in a withdrawal direction.

12. The receptacle of claim 2 wherein said retention means is pivotally mounted for rotating said gripping means to abut said sheath.

13. The receptacle of claim 12 wherein said gripping means further includes:
a gripping tooth having a preselected penetration angle forming a contact edge to deform into said sheath and a preselected attitude angle with respect to a tangent to said sheath where said contact edge abuts said sheath causing said contact edge to dig into said sheath when said sheath is moved in a withdrawal direction.

14. The receptacle of claim 13 wherein said gripping tooth includes a scalloped contact edge which engages a circumference of said sheath.

15. The receptacle of claim 12 wherein said gripping means further includes a plurality of gripping teeth arranged such that a first gripping tooth is normally engaged with said sheath and a successive tooth is brought into engagement with said sheath by moving said sheath in a withdrawal direction.

16. The receptacle of claim 1 further including:
alignment means for aligning said fiber optic cable operatively associate with said cover, said alignment means having an integral portion formed integrally with said cover.

17. A fiber optic cable receptacle, said fiber optic cable including a sheath surrounding optic fibers which are flush cut with said sheath to form a received finished end, said receptacle comprising:
a cover having a fiber optic cable opening through which said finished end of said fiber optic cable extends; and
alignment means for aligning said fiber optic cable and said finished end operatively associate with said cover, said alignment means having an integral portion formed integrally with said cover.

18. The receptacle of claim 17 wherein said alignment means includes a retaining lip extending axially along said fiber optic cable.

19. The receptacle of claim 18 wherein said alignment means includes a stop means limiting the length of insertion of said cable.

20. The receptacle of claim 19 wherein said stop means is a lip.

21. The receptacle of claim 20 wherein said stop means is a tapered reduction in a acceptance diameter of said alignment means.

22. A fiber optic cable receptacle comprising:
a cover having a cable opening and a gripping adjustment opening;
a housing attached to said cover;
a gripper having a tooth end and a distal end to either side of pivot arms, said gripper further including a resilient spring arm between said pivot arms and said distal end;
a pivot support arm pivotally supporting said pivot arms;
a channel receiving said cable and proving an opposing surface to fix said cable between said gripper and said opposing surface.

23. A fiber optic cable receptacle comprising:
a cover having a cable opening and a gripping adjustment opening;
a housing attached to said cover;
a gripper having a tooth end and a distal end to either side of pivot arms, said gripper further including a resilient spring arm between said pivot arms and said distal end;
a pivot support arm pivotally supporting said pivot arms;
a channel receiving said cable and proving an opposing surface to fix said cable between said gripper and said opposing surface, said channel is in said housing and causes said cable to curve accurately;
said pivot support arm is a clevis extending from said housing toward said cover;
a first gripping tooth is at said tooth end of said gripper and is biased into engagement with a sheath of said cable; and
said cable opening includes a spring surface against which said resilient spring bears to cause said tooth to engage said sheath.

24. The receptacle of claim 23 further including a successive tooth which is drawn into deeper engagement with said sheath by said first tooth when said cable is moved in a withdrawal direction without disengaging said first tooth.

25. The receptacle of claim 23 wherein said tooth has concave engagement with said cable.

26. A fiber optic cable receptacle comprising:
a cover having a cable opening and a gripping adjustment opening;
a housing attached to said cover;
a gripper having a tooth end and a distal end to either side of a pivot point, said gripper further including a resilient spring arm adjacent said distal end;
a pivot support arm pivotally supporting said gripper;
a channel receiving said cable and proving an opposing surface to fix said cable between said gripper and said opposing surface.

27. The receptacle of claim 26 wherein
said channel is in said cover and terminates in a stop lip for limiting the insertion of said cable;
said pivot support arm extends from said housing toward said cover and extends through a pivot hole at the pivot point;
a first gripping tooth is at said tooth end of said gripper and is biased into engagement with a sheath of said cable;
said spring arm is arcuate towards a spring distal end; and
said cover includes a spring surface against which said resilient spring bears to cause said tooth to engage said sheath.

28. The receptacle of claim 27 further including a successive tooth which is drawn into deeper engagement with said sheath by said first tooth when said cable is moved in a withdrawal direction without disengaging said first tooth.

29. The receptacle of claim 27 wherein said tooth has concave engagement with said cable.

30. A fiber optic cable receptacle comprising:
a cover having a cable opening and a gripping adjustment opening;
a housing attached to said cover;
a first gripper having a tooth end and a distal end to either side of a pivot hole, said gripper further including a resilient spring arm adjacent said distal end;
a second gripper having a tooth end and a distal end to either side of a pivot hole, said gripper further including a resilient spring arm adjacent said distal end;

a pivot support arm pivotally supporting said gripper; and a channel receiving said cable;

said first and second grippers receiving said cable between them.

31. A fiber optic cable receptacle comprising:

a cover having a cable opening and a gripping adjustment opening;

a housing attached to said cover;

a gripper having a tooth end and a distal end to either side of pivot arms, said gripper further including a resilient spring arm between said pivot arms and said distal end;

a pivot support arm pivotally supporting said pivot arms;

a channel receiving said cable and proving an opposing surface to fix said cable between said gripper and said opposing surface;

a coupler stop means for fixing a coupler against axial movement.

32. A fiber optic cable receptacle comprising:

a cover having a cable opening and a gripping adjustment opening;

a housing attached to said cover;

a gripper having a distal tooth end and an attachment end affixed to said cover, said ends joined by a resilient spring arm; and a channel receiving said cable and providing an opposing surface selectively fixing said cable between said gripper and said opposing surface.

33. A fiber optic cable receptacle comprising:

a cover having a cable opening and a gripping adjustment opening;

a housing attached to said cover;

a gripper having an engagement end and a distal end to either side of a pivot hole;

a pivot support arm pivotally supporting said gripper;

a channel receiving said cable and proving an opposing surface to fix said cable between said gripper and said opposing surface, said opposing surface having at least one gripping tooth tending to impede movement of said cable in a withdrawal direction.

34. A fiber optic cable receptacle comprising:

a cover having a fiber optic cable opening through which said fiber optic cable extends; and alignment means for aligning said fiber optic cable operatively associate with said cover, said alignment means having an integral portion formed integrally with said cover a fiber optic cable channel having an outer end which receives said fiber optic cable from outside said receptacle and an opposite inner end and;

a coupler having a median coupler flange, separating a cable interface and a device interface, said coupler flange having a outer surface bearing against said channel inner end and an inner flange surface, said cable interface abutting said cable adjacent said channel inner end;

a resilient stop adjacent said inner flange surface to prevent withdrawal of said cable interface from said channel; and an alignment spring tending to bias said outer surface against said channel inner end but allowing slight separation of said outer surface from said channel inner end to better align said cable with said coupler cable interface.

* * * * *